United States Patent
Yang

(10) Patent No.: US 7,010,679 B2
(45) Date of Patent: Mar. 7, 2006

(54) SYSTEM FOR SELECTING FROM MULTIPLE BIOS VERSIONS STORED IN A SINGLE MEMORY DEVICE

(75) Inventor: Tsung-Ju Yang, Ilan (TW)

(73) Assignee: Mitac Technology Corp., Hsinchu (TW)

( * ) Notice: Subject to any disclaimer, the term of this patent is extended or adjusted under 35 U.S.C. 154(b) by 518 days.

(21) Appl. No.: 10/195,352

(22) Filed: Jul. 15, 2002

(65) Prior Publication Data
US 2003/0115444 A1    Jun. 19, 2003

(30) Foreign Application Priority Data
Dec. 14, 2001   (TW) ............................. 90131131 A

(51) Int. Cl.
*G06F 9/00*    (2006.01)
*G06F 9/24*    (2006.01)
*G06F 9/445*    (2006.01)
*G06F 15/177*   (2006.01)

(52) U.S. Cl. ........................................ 713/2
(58) Field of Classification Search .................... None
See application file for complete search history.

(56) References Cited

U.S. PATENT DOCUMENTS

| | | | | |
|---|---|---|---|---|
| 5,327,531 A | * | 7/1994 | Bealkowski et al. | 714/6 |
| 5,835,760 A | * | 11/1998 | Harmer | 713/2 |
| 5,964,873 A | * | 10/1999 | Choi | 713/2 |
| 6,003,130 A | * | 12/1999 | Anderson | 713/2 |

FOREIGN PATENT DOCUMENTS

| | | |
|---|---|---|
| JP | 11-110218 | 4/1999 |
| JP | 11-306007 | 11/1999 |
| TW | 463128 | 11/2001 |

OTHER PUBLICATIONS

National Semiconductor, 100364 Low Power 16-Input Multiplexer, Jul. 1992, National Semiconductor Incorporated.*

* cited by examiner

*Primary Examiner*—Lynne H. Browne
*Assistant Examiner*—Matthew A. Henry
(74) *Attorney, Agent, or Firm*—Ladas & Parry LLP

(57) ABSTRACT

Computer equipment using a plurality of BIOS versions. The equipment includes a selecting device, a memory device, and a CPU. The selecting device provides a selecting signal responding to the BIOS version. The memory device is coupled to the selecting device to store the BIOS version, and outputs the responding BIOS version according to the selecting signal. The CPU is coupled to the memory device to load the responding BIOS version.

13 Claims, 2 Drawing Sheets

| $I_0$ | $I_1$ | $I_2$ | $I_3$ | CTRL 18 | CTRL 19 |
|---|---|---|---|---|---|
| 1 | 1 | 1 | 0 | 0 | 0 |
| 1 | 1 | 0 | 1 | 0 | 1 |
| 1 | 0 | 1 | 1 | 1 | 0 |
| 0 | 1 | 1 | 1 | 1 | 1 |

SYSTEM FOR SELECTING FROM MULTIPLE BIOS VERSIONS STORED IN A SINGLE MEMORY DEVICE

BACKGROUND OF THE INVENTION

1. Field of the Invention

The present invention relates in general to computer equipment. In particular, the present invention relates to computer equipment using a plurality of BIOS versions. The computer equipment selects a specific BIOS version to load from the plurality of BIOS versions to prevent the present BIOS version failing and causing computer shutdown.

2. Description of the Related Art

Computer equipment such as notebook or desktop uses a flash memory to store a Basic Input/Output System (BIOS). However, only a single BIOS version is stored in the flash memory. BIOS plays a most important part when the computer boots. Since the conventional computer has a only single BIOS, if the BIOS version fails, the computer can't boot successfully.

Therefore, since the computer can't boot successfully, users have no way to correct the failed BIOS version by the computer. The user must disassemble the case of the computer and reprogram the flash memory with a new BIOS version, or discharge the flash memory to restore the default BIOS version. However, the conventional method is difficult for the user.

U.S. Pat. No. 5,964,873, issued to Choi et al. discloses a method to update a ROM BIOS version, and U.S. Pat. No. 5,835,760, issued to Harmer et al. discloses a method and a device to provide BIOS version to the computer. However, the prior arts mentioned-above neither described a computer having a plurality of BIOS versions.

SUMMARY OF THE INVENTION

The object of the present invention is to provide computer equipment having a plurality of BIOS versions, with the desired BIOS version selected by a selecting device. Therefore, when One of the BIOS versionss fails, another BIOS version can be used to boot the computer. The problems of the conventional computer are solved.

To achieve the above-mentioned object, the present invention provides computer equipment using a plurality of BIOS versions, which includes a selecting device, a memory device, and a CPU. The selecting device provides a selecting signal responding to the BIOS version. The memory device is coupled to the selecting device to store the BIOS version, and outputs the responding BIOS version according to the selecting signal. The CPU is coupled to the memory device to load the responding BIOS version.

In addition, if the present invention provides four BIOS versions, the selecting device comprises a first NAND logic gate, a second NAND logic gate, a third NAND logic gate, and a AND logic gate. The first NAND logic gate receives a first input signal and a second input signal and outputs a first controlling signal to the memory device. The second NAND logic gate receives the first input signal, the second input signal and a third input signal, then outputs a first comparing signal. The third NAND logic gate receives the first input signal, the second input signal, the third input signal and a fourth input signal, then outputs a second comparing signal. The AND logic gate receives the first comparing signal and the second comparing signal, and outputs a second controlling signal to the memory device.

In addition, one of the four BIOS versions is selected according to the input signal by the selecting device.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE PREFERRED EMBODIMENT

Figure 1:
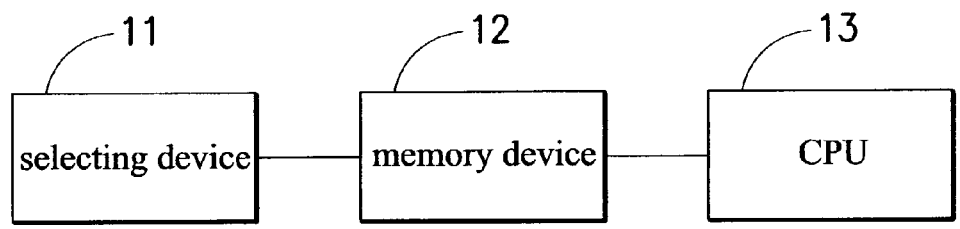
FIG. 1 is an architecture diagram according to the embodiment of the present invention.

FIG. 1 is an architecture diagram according to the embodiment of the present invention.

The computer equipment of the present invention comprises a flash memory storing a plurality of BIOS versions. One of the BIOS versions is selected by a selecting device 11.

Figures 3, 4:
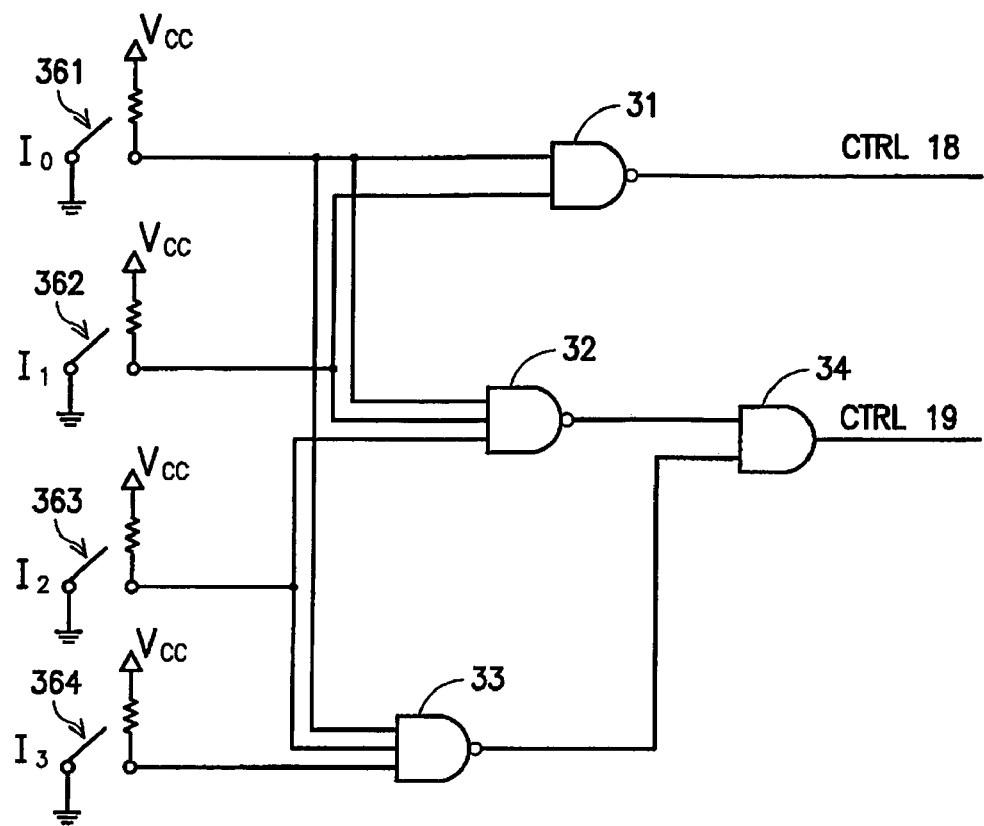
FIG. 3 is an architecture diagram of the selecting device according to the embodiment of the present invention.
FIG. 4 is a true table of the input signals $I_0 \sim I_3$ and the output control signals of the selecting device.

The selecting device 11 provides a selecting signal responding to the desired BIOS version. In the present embodiment, the structure is shown in FIG. 3. FIG. 3 is an architecture diagram of the selecting device according to the embodiment of the present invention.

The selecting device 11 comprises a first NAND logic gate 31, a second NAND logic gate 32, a third NAND logic gate 33, and a AND logic gate 34. The first NAND logic gate 31 receives a first input signal To and a second input signal $I_1$ and outputs a first controlling signal CTRL 18 to the memory device 12. The second NAND logic gate 32 receives the first input signal $I_0$, the second input signal $I_1$ and a third input signal $I_2$, then outputs a first comparing signal. The third NAND logic gate 33 receives the first input signal $I_0$, the third input signal $I_2$ and a fourth input signal $I_3$, then outputs a second comparing signal. The AND logic gate 34 receives the first comparing signal and the second comparing signal, and outputs a second controlling signal CTRL19 to the memory device 12. In the present embodiment, the input signals $I_0 \sim I_3$ are controlled by switches 361~364 respectively to control the voltage level of the first controlling signal CTRL18 and the second controlling signal CTRL19.

Figure 2:
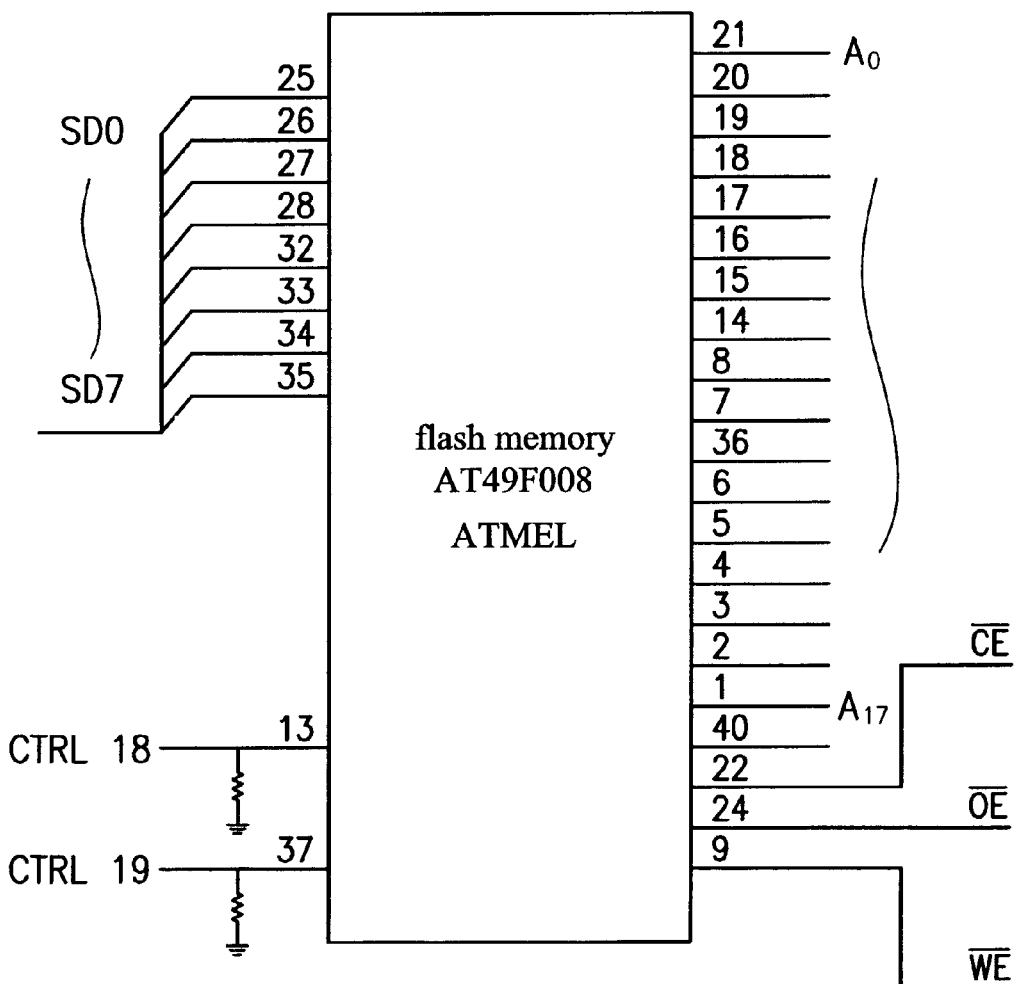
FIG. 2 is a diagram of the chip AT49F008 shown the number and the function of pins.

The memory device 12 is coupled to the selecting device 11 to store the BIOS, and outputs the responding BIOS according to the selecting signal. Here, the memory device 12 is a flash memory. In addition, the memory device 12 of the present embodiment stores four BIOS versions. The chip AT49F008 or AT49F8192 can be used in the present embodiment. FIG. 2 is a diagram of the chip AT49F008 showing the number and the function of pins, wherein pin /22/ is $\overline{CE}$ (Chip Enable), pin /24/ is $\overline{OE}$ (Output Enable), and pin /9/ is $\overline{WE}$ (Write Enable).

Pin /13/ and pin /37/ of the chip receive the signals CTRL 18 and CTRL 19 respectively, and output a BIOS version responding to the signals CTRL 18 and CTRL 19, then the BIOS version is output by SD0~SD7.

FIG. 4 is a true table of the input signals I0~I3 and the output control signals of the selecting device. The combinations of the control signals (CTRL 18, CTRL 19) are (0,0), (0,1), (1,0), (1,1), which are controlled by the input signals $I_0$~$I_3$. In addition, the four combinations are responding to the four BIOS versions, respectively. The memory device 12 outputs the BIOS version responding to the provided control signals (CTRL 18, CTRL 19).

The CPU 13 is coupled to the memory device 12 by BUS to load the responding BIOS. Here, the CPU 13 is connected to the other peripherals.

If the present BIOS version encounters an error during boot, the computer will shut down. Therefore, the user needs to perform a complicated process to make the conventional computer operate successfully.

According to the present invention, the user needs only select another BIOS version in the memory device 12 using the selecting device 11. The computer of the present invention then accesses the new selected BIOS version to boot successfully.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. Computer equipment using a plurality of BIOS versions, comprising:
    a selecting device for providing a selecting signal responding to the BIOS version, wherein the selecting device comprises:
    a first NAND logic gate receiving a first input signal and a second input signal, and outputting a first controlling signal;
    a second NAND logic gate receiving the first input signal, the second input signal and a third input signal, and outputting a first comparing signal;
    a third NAND logic gate receiving the first input signal, the third input signal and a fourth input signal, and outputting a second comparing signal; and
    an AND logic gate receiving the first comparing signal and the second comparing signal, and outputting a second controlling signal;
    a memory device for storing the BIOS versions, and outputting the selected BIOS version according to the selecting signal, wherein said first controlling signal and said second controlling signal are applied to the memory device; and
    a CPU coupled to the memory device for loading the responding BIOS version.

2. The computer equipment as claimed in claim 1, wherein the memory device has four BIOS versions.

3. The computer equipment as claimed in claim 1, wherein the first input signal, the second input signal, the third input signal and the fourth input signal are controlled by switches respectively.

4. The computer equipment as claimed in claim 1, wherein the memory device comprises two input ports to receive the first controlling signal and the second controlling signal, and obtains the selecting signal according to the first controlling signal and the second controlling signal.

5. The computer equipment as claimed in claim 1, wherein the memory device is a flash memory.

6. The computer equipment as claimed in claim 1, wherein the BIOS version output by the memory device is input to the CPU by a data bus.

7. The computer equipment as claimed in claim 6, wherein the data bus is coupled to other peripheral devices.

8. Computer equipment using a plurality of BIOS versions, comprising:
    a plurality of switches providing a first input signal, a second input signal, a third input signal and a fourth input signal;
    a selecting device providing a selecting signal responding to the BIOS version according to the first input signal, the second input signal, the third input signal and the fourth input signal;
    a memory device coupled to the selecting device for storing the BIOS versions, comprising two input ports to receive a first controlling signal and a second controlling signal, obtaining the selecting signal according to the first controlling signal and the second controlling signal, and outputting the selected BIOS version according to the selecting signal; and
    a CPU coupled to the memory device for loading the responding BIOS version.

9. The computer equipment as claimed in claim 8, wherein the memory device has four BIOS versions.

10. The computer equipment as claimed in claim 8, wherein the selecting device comprises:
    a first NAND logic gate receiving the first input signal and the second input signal, and outputting the first controlling signal to the memory device;
    a second NAND logic gate receiving the first input signal, the second input signal and the third input signal, and outputting a first comparing signal;
    a third NAND logic gate receiving the first input signal, the third input signal and the fourth input signal, and outputting a second comparing signal; and
    an AND logic gate receiving the first comparing signal and the second comparing signal, and outputting the second controlling signal to the memory device.

11. The computer equipment as claimed in claim 8, wherein the memory device is a flash memory.

12. The computer equipment as claimed in claim 8, wherein the BIOS version output by the memory device is input to the CPU by a data bus.

13. The computer equipment as claimed in claim 12, wherein the data bus is coupled to other peripheral devices.

* * * * *